United States Patent [19]

Burkart

[11] Patent Number: 5,584,043

[45] Date of Patent: Dec. 10, 1996

[54] APPARATUS HAVING A SMART CARD ACCOMODATED BY A DISKETTE FRAME CONTAINING PROCESSOR MEMORY AND BATTERY POWER FOR INTERFACING WITH A STANDARD DISKETTE DRIVE

[75] Inventor: Axel E. Burkart, Utting, Germany

[73] Assignee: SmartDiskette GmbH, Idstein, Germany

[21] Appl. No.: 170,166

[22] PCT Filed: Jun. 16, 1992

[86] PCT No.: PCT/EP92/01356

§ 371 Date: Apr. 19, 1994

§ 102(e) Date: Apr. 19, 1994

[87] PCT Pub. No.: WO93/00658

PCT Pub. Date: Jan. 7, 1993

[30] Foreign Application Priority Data

Jun. 26, 1991 [DE] Germany ............................ 41 21 023.9

[51] Int. Cl.⁶ .................................................... G06F 13/00
[52] U.S. Cl. ........................ 395/882; 395/822; 395/894; 395/188.01; 364/246.6; 364/249; 364/249.2; 364/ DIG. 1
[58] Field of Search ................................ 235/492; 380/23, 380/25; 340/825.34; 395/882, 894, 188.01, 822

[56] References Cited

U.S. PATENT DOCUMENTS

| 3,700,826 | 10/1972 | O'Neal | 360/137 |
|---|---|---|---|
| 3,940,758 | 2/1976 | Margolin | 345/169 |
| 3,946,156 | 3/1976 | Budrose | 252/95 |

(List continued on next page.)

FOREIGN PATENT DOCUMENTS

| 0178805 | 4/1986 | European Pat. Off. . |
|---|---|---|
| 0328124A2 | 8/1989 | European Pat. Off. . |
| 0373411 | 6/1990 | European Pat. Off. . |
| 3534638A1 | 5/1986 | Germany . |
| 3528199 | 2/1987 | Germany . |
| 3701114A1 | 8/1987 | Germany . |
| 8709268.9 | 10/1987 | Germany . |
| 390345A1 | 6/1990 | Germany . |
| 2-161670 | 6/1990 | Japan . |
| 3-30007 | 2/1991 | Japan . |
| 3-233790 | 10/1991 | Japan . |
| 664635 | 3/1988 | Switzerland . |

OTHER PUBLICATIONS

IBM Technical Disclosure Bullentin, vol. 30, No. 3, Aug. 1987, "Personal Transaction Card", pp. 1262–1265.

IBM Technical Disclosure Bulletin, vol. 28, No. 6, Nov. 1985, "Transaction Handling System Using a Bank Card with Display, Input and Memory Functions", pp. 2568–2570.

(List continued on next page.)

*Primary Examiner*—Thomas C. Lee
*Assistant Examiner*—Le Hien Luu
*Attorney, Agent, or Firm*—Spencer & Frank

[57] ABSTRACT

An element which can be plugged into an EDP device, having a card which is equipped with components, including a processor and data memory, a frame having an exterior form, which is designed to accommodate the card, a first interface for transferring data between the element and the EDP device, and a second interface formed by contacts on the card and on the frame, for transferring data to and from the card. The exterior form of the frame is that of a diskette so that it can be inserted into a diskette station of an EDP device. The first interface between the element and the EDP device is designed in a standard fashion, so that data can be transferred using a standard read/write device already present in the diskette station of the EDP device. The frame carries a battery for supplying current via the interface to the components located on the card, and carries an additional processor and data memory for providing the element with additional processor and storage capacity.

13 Claims, 5 Drawing Sheets

U.S. PATENT DOCUMENTS

| | | | |
|---|---|---|---|
| 3,978,524 | 8/1976 | Gordon et al. | 369/1 |
| 4,034,164 | 7/1977 | Westmoland | 369/11 |
| 4,228,474 | 10/1980 | Neal, Jr. | 360/137 |
| 4,504,871 | 3/1985 | Berwick et al. | 360/31 |
| 4,575,621 | 3/1986 | Dreisfus | 235/380 |
| 4,701,601 | 10/1987 | Francini et al. | 235/449 |
| 4,734,897 | 3/1988 | Scholtz | 364/810 |
| 4,755,883 | 7/1988 | Uehira | 358/335 |
| 4,769,764 | 9/1988 | Levanon | 361/680 |
| 4,774,618 | 9/1988 | Raviv | 360/133 |
| 4,791,283 | 12/1988 | Burkhardt | 235/438 |
| 4,814,924 | 3/1989 | Ozeki | 360/133 |
| 4,860,128 | 8/1989 | Nakagawa | 360/60 |
| 4,935,962 | 6/1990 | Austin | 380/25 |
| 4,965,691 | 10/1990 | Iftikar et al. | 360/133 |
| 5,044,798 | 9/1991 | Roylance et al. | 400/472 |
| 5,050,020 | 9/1991 | Campbell et al. | 360/92 |
| 5,055,947 | 10/1991 | Satoh | 360/62 |
| 5,068,894 | 11/1991 | Hoppe | 380/23 |
| 5,159,182 | 10/1992 | Eisele | 235/492 |
| 5,204,663 | 4/1993 | Lee | 340/825.34 |
| 5,224,216 | 6/1993 | Gordon et al. | 395/822 |
| 5,237,551 | 8/1993 | Ogawa et al. | 369/54 |
| 5,321,817 | 6/1994 | Feinstein | 395/280 |
| 5,338,923 | 8/1994 | Grieu | 235/492 |

OTHER PUBLICATIONS

"Stiffened Card With Integrated Circuit" IBM Technical Disclosure Bullentin, vol. 28, Nov. 11, Apr. 1986, pp. 4723–4725.

"IC–Cards–neue Aspekte der Informationsverarbeitung" Dantentechnik, Electronik 19/19.9. 1986, pp. 99–101.

"Personal Transaction Card" IBM Technical Disclosure Bulletin, vol. 30, No. 3, Aug. 1987, pp. 1262–1265.

"Transaction Handling System Using A Bank Card With Display, Input and Memory Functions" IBM Technical Disclosure Bulletin, vol. 28, No. 6, Nov. 1985, pp. 2568–2570.

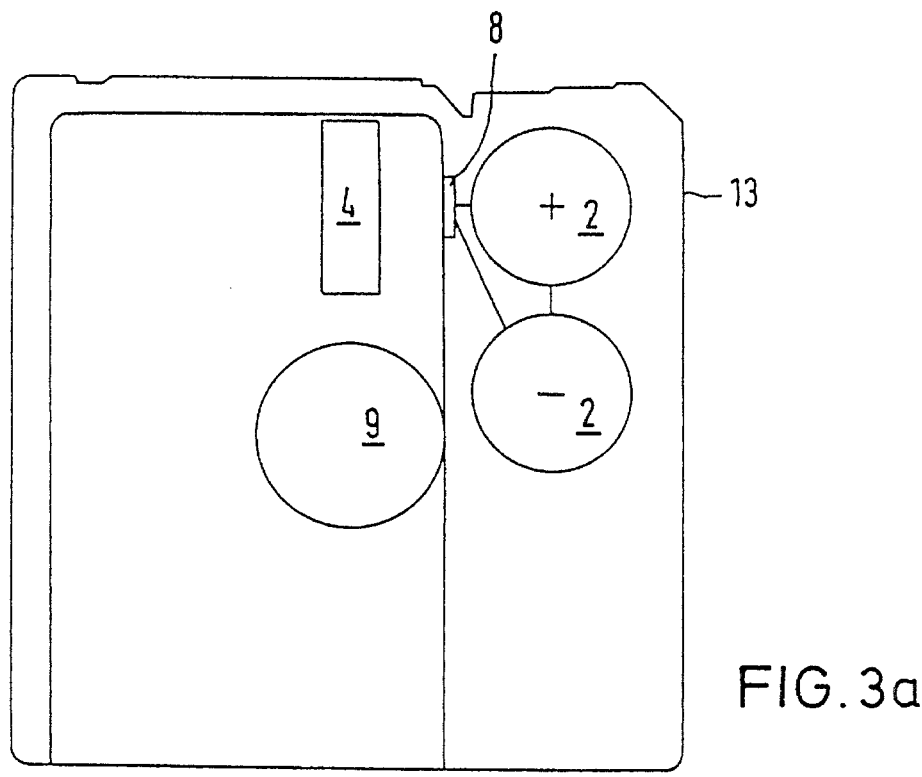
FIG.3a
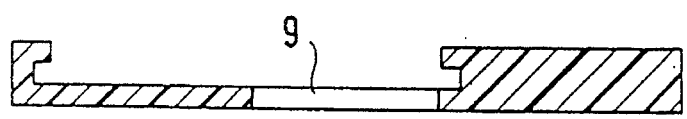
FIG.3b
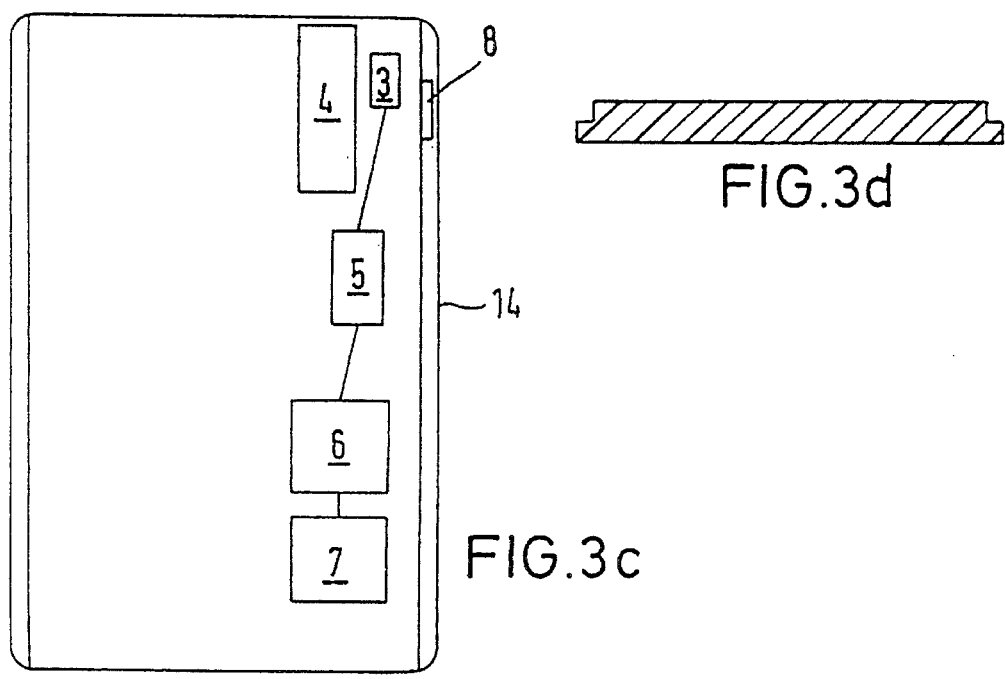
FIG.3d
FIG.3c

APPARATUS HAVING A SMART CARD ACCOMODATED BY A DISKETTE FRAME CONTAINING PROCESSOR MEMORY AND BATTERY POWER FOR INTERFACING WITH A STANDARD DISKETTE DRIVE

BACKGROUND OF THE INVENTION

1. Field of the Invention.

The invention relates to an element for insertion into diskette drive.

2. Background Information

From the earlier German patent registration P 39 03 454 A1 a component (Smartdiskette) is known which can be inserted into an EDP installation. This component is designed as a diskette and equipped with a special interface. The interface is designed in such a manner that a data transfer can be performed between a processor located in the diskette and the EDP installation via the already existing read/write device. The particular advantages affiliated with this feature are based on the fact that data can be transferred between the processor of the diskette and the EDP installation without any additional interfaces being required. One characteristic of the interface section, the converter, is known from the German Patent registration P 40 36 336.83–53.

SUMMARY OF THE INVENTION

The undelying task of the present invention is to realize a multitude of application possibilities of the component.

This task is fulfilled in that the element (diskette), which can be plugged into an EDP installation, consists of two components which can be plugged together. One component possesses the external shape of a diskette and serves as a frame to accomodate the second component, which contains all or some of the electronic units.

Some of the electronic components can also be located inside the frame.

The advantages of this measure are that the dimensions of the second component are smaller than the dimensions of the diskette. The second component has the dimensions of a mini-chip card, a chip card (0.8 mm or 2 mm thick) or a card with the dimensions 55 mm ×60 mm×3 mm. These cards can be transported without difficulty in a purse or wallet. Consequently the advantages of the element as stated in the German patent registration P 39 03 454 A1, are combined with the advantages of a chip card. The disadvantages of a chip card, such as limited memory and processor capacity as well as the fact that it requires a special read/write device, are eliminated by this invention. The functions of the Smartdiskette, as stated in the German patent registration P 39 03 454 A1, can also be performed using this invention.

An additional function is described here as an example. Here we are referring to a patient's data card as set down in the German disclosure provision DE 35 34 638 A1. The disadvantage of the patient data card in the specified form of a standard commercial diskette is that the personal data related to the patient can be read at any time as the data stored on commercially available diskettes are uncoded. A further disadvantage lies in the dimensions of a standard diskette. It cannot be transported comfortably like a chip card in a purse or wallet.

As is also stated in the above-mentioned disclosure provision, patient data can be stored on magnetic strip cards or chip cards. The magnetic strip cards have the advantage of small dimensions, but the same disadvantage as standard commercial diskettes with respect to the easy reading of personal data. The chip card does not have this disadvantage. Confidential data can be safely stored on this medium. They can only be accessed when the correct secret code has been previously entered. The disadvantages of a chip card are that an insufficient amount patient data can be stored on this medium and that special read/write devices are required.

With this invention the disadvantages stated are completely eliminated. The diskette drive of any personal computer and the magnetic interface located in the element itself serve as the interface for the reading and writing of the patients data. Depending on the model of the pluggable board in the frame several megabytes can be stored there. Reading and writing of the data is only then permitted by the processor—also integrated into the frame once a secret access code has been entered and this has been identified as correct by the processor.

Advantages, details and application possibilities of this invention are to be illustrated on the basis of the schematically depicted examples in the figures.

BRIEF DESCRIPTION OF THE DRAWINGS

FIG. 3a Frame of the Smartdiskette with battery(s) 2, and plugs 8 as current interface to the processor/memory card as well as a recess 9 where normally the drive for a magnetic disk is located.

FIG. 3b Cross-section of FIG. 3a with lateral guide rails.

FIG. 3c Processor/memory card with external dimensions of a chip card but 2 mm thick with processor 6, memory card 7 and plugs 8 as data and current interface to the frame of the Smartdiskette as well as converter 3 and controller for magnetic interface 5.

FIG. 3d Cross-section of FIG. 3c with appropriate sides so that the processor/memory card can be inserted into the guide rails of the frame of the Smartdiskette.

DETAILED DESCRIPTION OF THE PREFERRED EMBODIMENT(S)

Figure 1A:
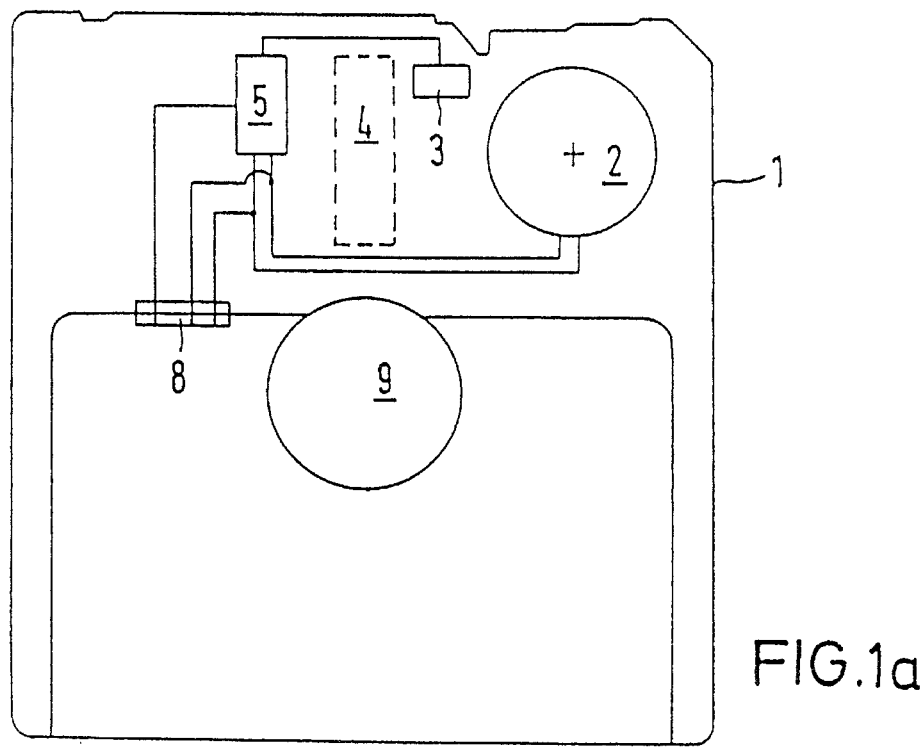
FIG. 1a A Smartdiskette with battery 2, converter 3, controller for magnetic interface 5 and plugs 8 as data and current interface for the processor/storage board (memory card) as well as a recess 9 normally reserved for the drive for a magnetic disk.
Figure 1B:
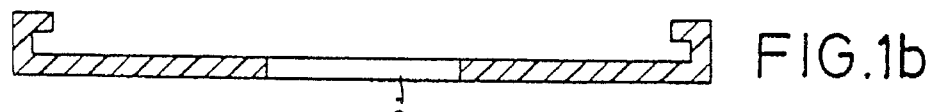
FIG. 1b Cross-section of FIG. 1 a with lateral guide rails and a recess 9 normally reserved for the drive for a magnetic disk.
Figure 1C:
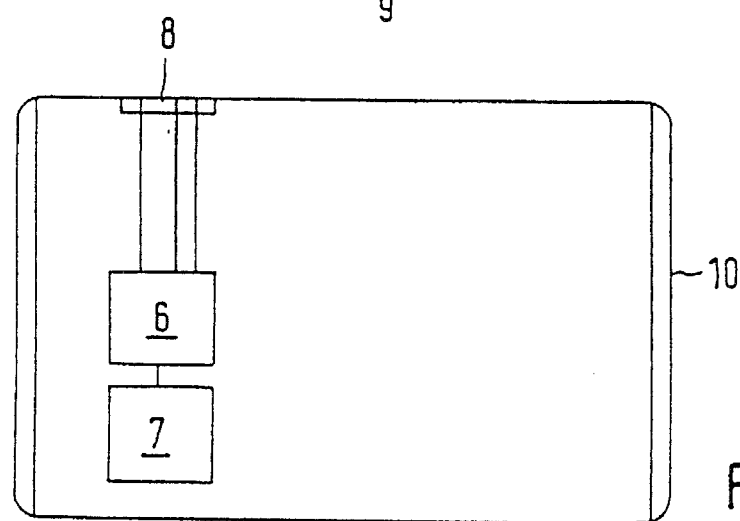
FIG. 1c Processor/memory card with external dimensions of a chip card but 2 mm thick with processor 6, memory chip 7 and plugs 8 as data and current interface to the frame of the Smartdiskette.
Figure 1D:
FIG. 1d Cross-section of FIG. 1c with flattened sides so that the processor/memory card can be inserted into the guide rails of the frame of the Smartdiskette.

The Smartdiskette depicted in FIG. 1a and 1b contains a recess of 2 millimeters to accomodate a processor/memory card 10 as well as plugs 8 in order to supply the processor/memory card 10 with current from the battery 2 and to produce a data link from the processor 6 of board 10 to the magnetic interface 5 of the Smartdiskette 1. Furthermore, the Smartdiskette 1 contains a recess 9 on the bottom side where normally the drive for a magnetic disk is located. The 2 millimeter thick processor/memory card depicted in FIGS. 1c and 1d contains in addition to the processor 6, a data memory 7 as well as plugs 8, in order to supply the Smartdiskette with current from battery 2 and to produce a data link from the processor 6 to the magnetic interface 5 of the Smartdiskette 1. Alongside the processor 6, the 2-millimeter thick processor/memory card contains a data memory 7 and plugs 8 for the current supply from the battery 2 of the SmartDiskette and for establishing a data link from processor 6 to the magnetic interface 5 of the SmartDiskette 1. The wide sides are tapered to 1 millimeter so that the card 10 can be plugged into the recess of the SmartDiskette 1.

Figure 2A:
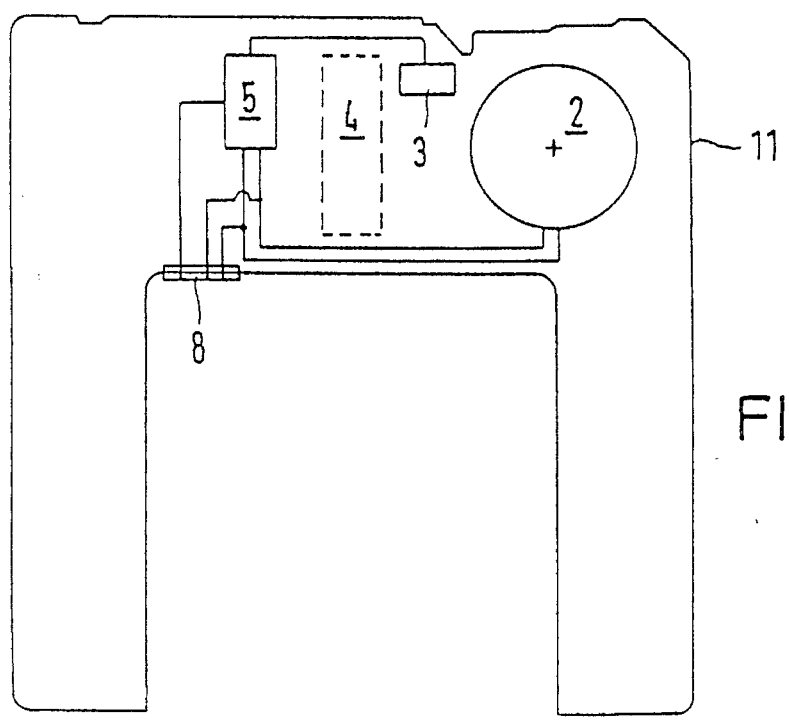
FIG. 2a Frame of the Smartdiskette with battery 2, converter 3, controller for magnetic interlace 5 and plugs 8 as data and current interface for the processor/memory card.
Figure 2B:
FIG. 2b Cross-section of FIG. 2a with lateral guide rails.
Figure 2C:
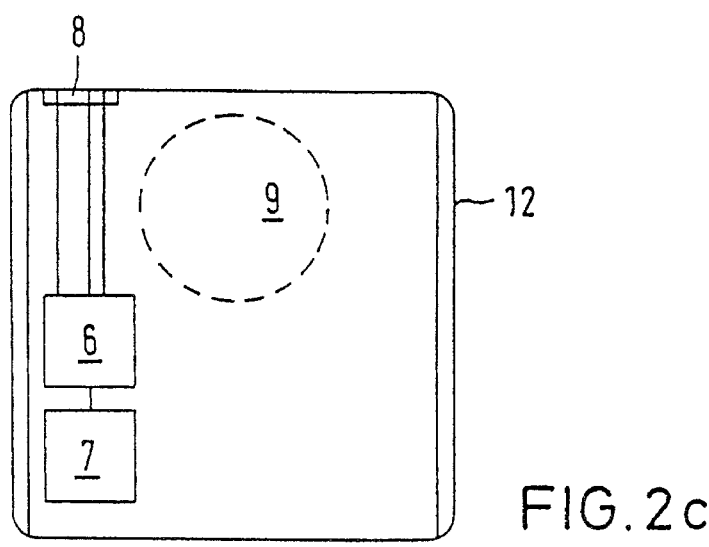
FIG. 2c Processor/memory card with external dimensions 60 mm×55 mm×3 mm with processor 6, memory card 7 and plugs 8 as data and current interface to the frame of the Smartdiskette as well as a recess 9 where normally the drive for a magnetic disk is located.
Figure 2D:
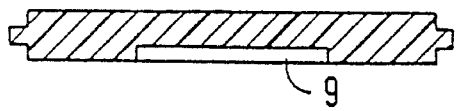
FIG. 2d Cross-section of FIG. 2c with appropriate sides so that the processor/memory card can be inserted into the guide rails of the frame of the Smartdiskette as well as a recess 9 where normally the drive for a magnetic disk is located.

The SmartDiskette 11 shown in FIGS. 2a and 2b has a cutout with a 1-millimeter wide groove to accommodate a 3-millimeter wide processor/memory card 12 alongside plugs 8 for supplying the processor/memory card 12 with current from the battery 2 and establishing a data link from processor 6 of card 12 to the magnetic interface 5 of the SmartDiskette 11. Alongside the processor 6, the 3-millimeter thick processor/memory card shown in FIGS. 2c and 2d contains a data memory 7 and plugs 8 for the current supply from the battery 2 of the SmartDiskette and for establishing a data link from processor 6 to the magnetic interface 5 of the SmartDiskette 1. The long sides contain a 1-millimeter thick spring which enables card 12 to be plugged into the cutout and the groove of the SmartDiskette 11. Further, card 12 contains a recess 9 on the bottom. The drive for a magnetic disk is normally located here.

The SmartDiskette 13 shown in FIGS. 3a and 3b contains a 2-millimeter recess for the accommodation of a processor/memory card with integrated magnetic interface 14 alongside plugs 8 for supplying card 14 with current from the battery 2. Further, SmartDiskette 13 contains a recess 9 on the bottom. The drive for a magnetic disk is normally located here. Alongside the processor 6, the 2-millimeter thick processor/memory card shown in FIGS. 3c and 3d contains a data memory 7, converter 3 and controller for magnetic interface 5, alongside plugs 8 for the current supply from the battery 2 of the SmartDiskette. The long sides are tapered to a width of 1 millimeter so that card 14 can be plugged into the recess of the SmartDiskette 13.

Figure 4A:
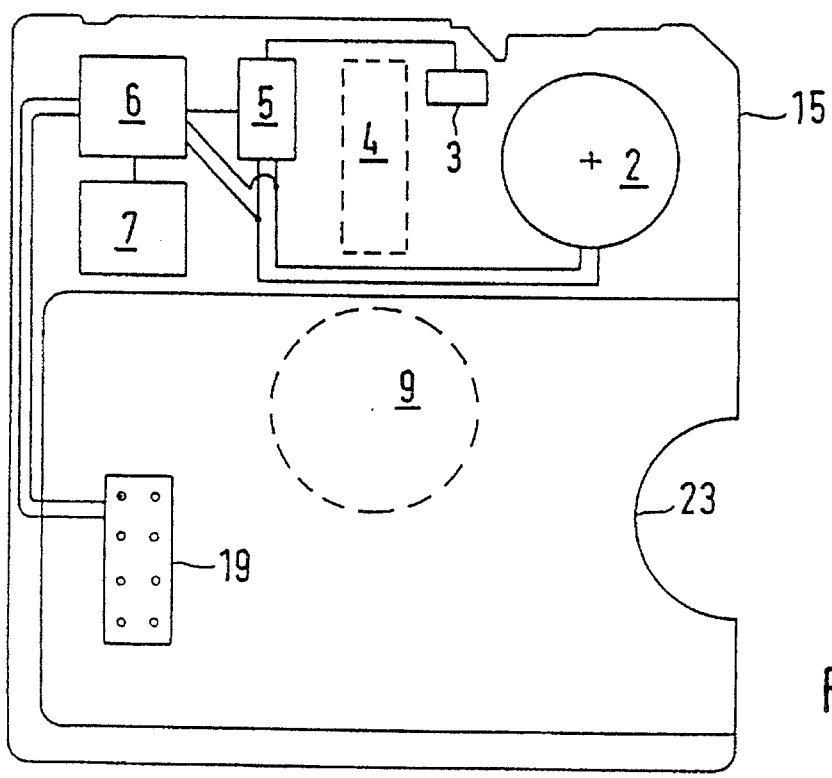
FIG. 4a A Smartdiskette with battery 2, converter 3, controller for magnetic interface 5, processor 6, memory card 7 and contact device 19 for chip card and recessed grip 23 for removing the chip card as well as a recess 9 where normally the drive for a magnetic disk is located.
Figure 4B:
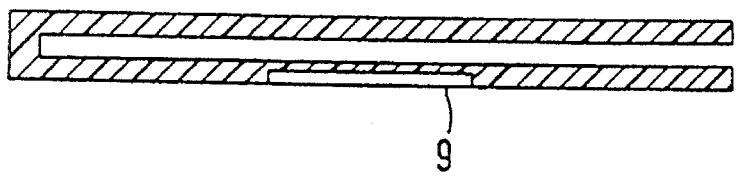
FIG. 4b Cross-section of FIG. 4a with a recess for inserting a chip card and a recess 9 where normally the drive for a magnetic disk is located.
Figure 4C:
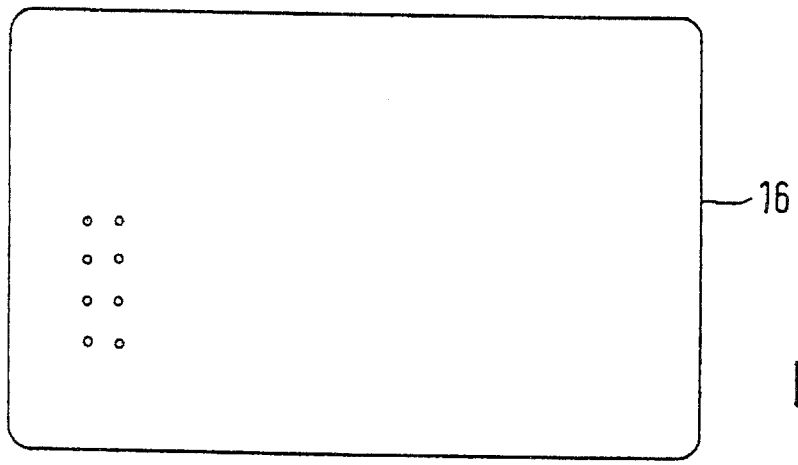
FIG. 4c Standard chip card with standard contacts, processor and memory card.

The SmartDiskette 15 shown in FIGS. 4a and 4b contains a 2-millimeter recess, in which a chip card 16 can be plugged in from the side alongside a contact device 19 which supplies the chip card 16 with current from the battery 2 and establishes a data link from the processor of the chip card 16 to the processor (6) of the SmartDiskette 15. Further, the SmartDiskette 15 contains a recess 9 on the bottom. The drive for a magnetic disk is normally located here. There is a recessed grip 23 for pulling out the chip card 16 at the right hand edge of the SmartDiskette 15. The chip card 16 shown in FIG. 4c is a standard 0.8-millimeter thick chip card with processor and a data memory. It also has contacts for supplying current from battery 2 of the SmartDiskette 15 and for establishing a data link from the processor of the chip card to processor 6 of the SmartDiskette 15.

Figures 5A, 5B:
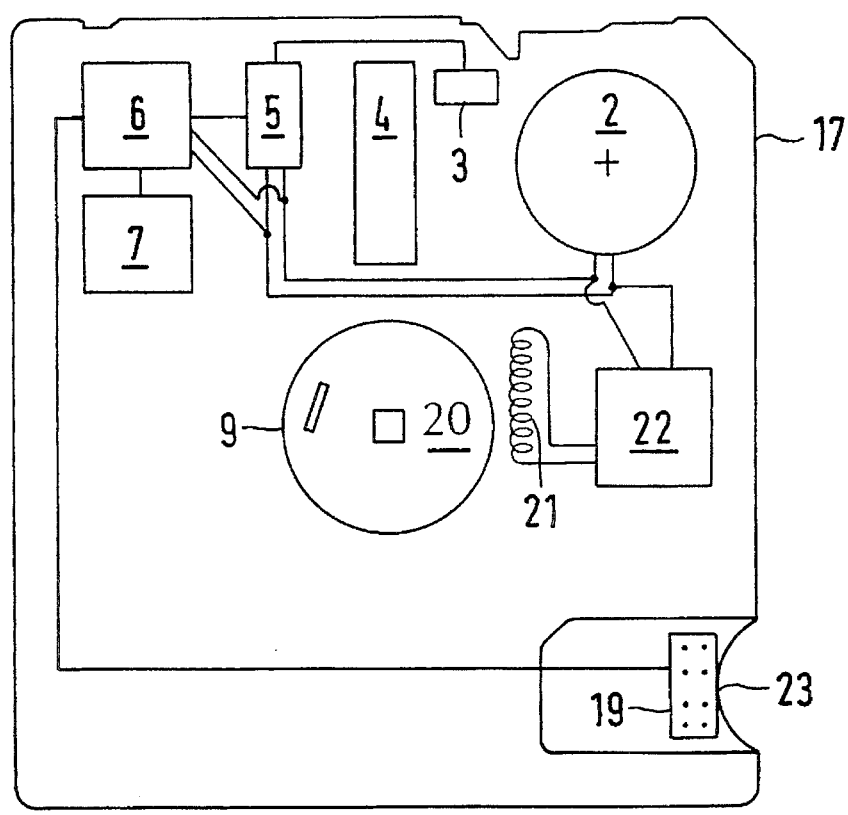
FIG. 5a A Smartdiskette with battery 2, converter 3, controller for magnetic interface 5, current generator consisting of rotor 20, stator 21, current regulator 22, contact device 19 for mini-chip card 18 as well as recessed grip 23 for removing the mini-chip card.
FIG. 5b A mini-chip card with processor and data memory.

The SmartDiskette 17 shown in FIG. 5a contains a 1-millimeter recess, in which a chip card 18 can be plugged in from the side, and a contact device 19 for supplying the chip card 18 with current from the battery 2 and for establishing a data link from the processor of the chip card 18 to the processor (6) of the SmartDiskette 17. Further, the SmartDiskette 17 contains a recess 9 on the bottom. The drive for a magnetic disk is normally located here. There is a recessed grip 23 for pulling out the mini-chip card 18 at the right hand edge of the SmartDiskette 17. The chip card shown in FIG. 5b is a standard 0.8-millimeter thick mini-chip card with processor and a data memory. It also has contacts for supplying current from battery 2 of the SmartDiskette 17 and for establishing a data link from the processor of the mini-chip card to processor 6 of the SmartDiskette 17. In this embodiment, the SmartDiskette includes battery 2 connected to a current generator comprised of rotor 20, stator 21, and current regulator 22.

A SmartDiskette, as described in this invention, with plug-in processor/memory card and all its associated advantages offers a wide range of possible applications, as can be seen from the following list:

Application Possibilities

Read/write device for chip cards and mini-chip cards

Communication of a chip card and mini-chip card with a PC

Memory card with several megabytes storage capacity

Memory card with integrated processor for checking an access code. The memory is enabled only if the access code is recognized as being correct A portable safe data carder, which can be carried comfortably in a purse or wallet, and which can communicate with any standard PC when it is plugged into the SmartDiskette.

Advantages

Can be used in conjunction with any PC or workstation with 3½ inch drive

Can be used with Laptops and Notebooks

Is independent of the PC operating system capacity

Is independent of the available interfaces and plug-in locations of the PC

No normalization problems. Normalized interlaces are already available

There are no hardware installation costs

Higher data rate (up to 500 kbit/sec)

Space-saving and portable

High storage capacity (several megabytes)

What is claimed is:

1. An element which can be plugged into an EDP device, comprising:

a card which is equipped with components, including a processor and data memory;

a frame, having an exterior form, which is designed to accommodate said card;

a first interface for transferring data between the element and the EDP device; and a second interface formed by contacts on the card and on the frame, for transferring data to and from the card;

the exterior form of said frame being that of a diskette so that it can be inserted into a diskette station of an EDP device, said first interface between the element and the EDP device being designed in a standard fashion, so that data can be transferred using a standard read/write device already present in the diskette station of the EDP device;

said frame carrying a battery for supplying current via the second interface to the components located on the card, and carrying an additional processor and data memory for providing the element with additional processor and storage capacity via a data link established by the second interface.

2. The element according to claim 1, wherein said frame has a recess for accommodating the drive of the diskette station.

3. The element according to claim 1, wherein the first interface is part of the chip card.

4. The element according to claim 1, wherein said frame is equipped with a current generator.

5. The element according to claim 4, wherein the current generator comprises a rotor which is driven by a drive of the diskette station when the element is inserted therein, a stator and a regulator.

6. A patient data card comprising an element according to claim 1, wherein patient data is stored thereon.

7. A process for access protection comprising utilizing a plurality of elements according to claim 1, wherein access to the data memory is not permitted until a valid access code has been entered.

8. A process according to claim 7, further comprising modifying the access code, wherein modification of the access code is permitted only if the previously valid access code has been input.

9. The element according to claim 1, wherein said card has a recess for accommodating the drive of the diskette station.

10. The element according to claim 1, wherein said frame and said card have a respective recess for accommodating the drive of the diskette station.

11. The element according to claim 1, wherein the frame is equipped with guide rails which accommodate said card.

12. The element according to claim 1, wherein the frame includes a slot into which said card is inserted.

13. The element according to claim 1, wherein the frame includes a recessed grip for facilitating insertion and removal of said card to and from the frame.

* * * * *